Nov. 1, 1938.    J. BUCHER ET AL    2,135,165
PRESSURE COOLER
Filed June 22, 1936
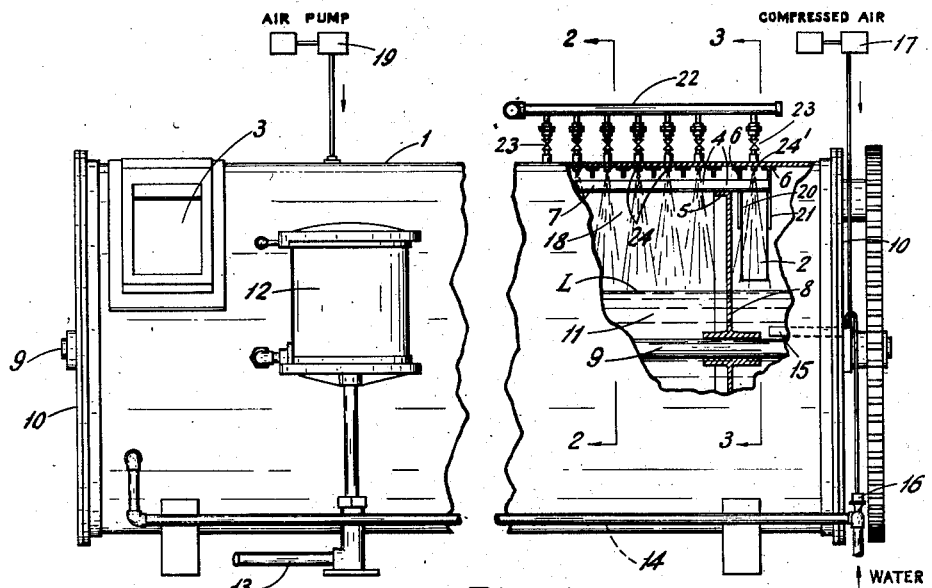
Fig. 1.
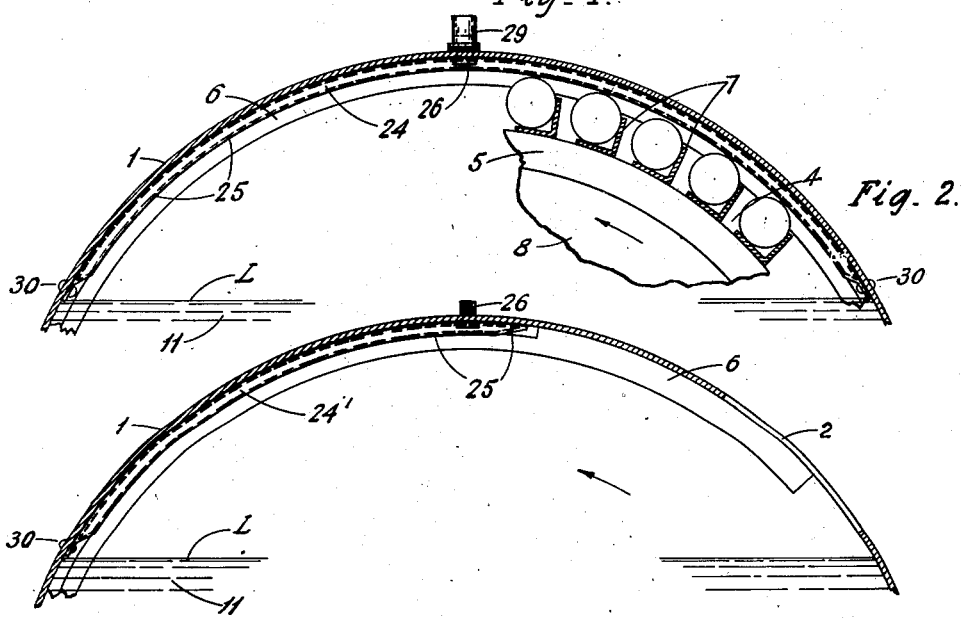
Fig. 2.
Fig. 3.
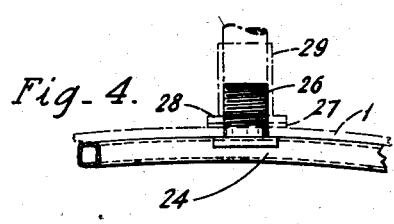
Fig. 4.
INVENTORS.
Joseph Bucher
Emery F. Tullar
BY
ATTORNEY.

Patented Nov. 1, 1938

2,135,165

UNITED STATES PATENT OFFICE 2,135,165

PRESSURE COOLER

Joseph Bucher, Oak Park, and Emery F. Tullar, Wheaton, Ill., assignors to Food Machinery Corporation, San Jose, Calif., a corporation of Delaware Application June 22, 1936, Serial No. 86,704

6 Claims. (Cl. 62—104)

This invention relates to pressure coolers of the type used for cooling canned goods after a cooking or sterilizing operation and is more specifically concerned with means for and a method of cooling such goods which enable rapid and continuous cooling thereof.

Certain known types of pressure coolers have a container or shell provided with a body of cooling liquid, usually water, and an apparatus for progressing cans therethrough so as to remove heat from the goods. The container is entirely closed and provides an air space above the cooling water through which the canned goods are passed between successive immersions in the cooling water. This construction is common in pressure coolers such as will hereinafter be described. Certain disadvantageous results are commonly present in this type of cooler. For example, cooling of cans of condensed milk in the above type of cooler has resulted in the formation of more or less "skin" and also some degree of "burn on", i. e., milk which adheres to the hot can, both of which appear as flakes or the like in the finished product. This undesirable condition is apparently due to the cans being subjected for too long a time to the critical temperatures at which the above products are formed, because of cooling of the cans below the temperature of the milk while immersed in the cooling water, and the subsequent rapid reheating of the cans by the milk and air in passing through the air space above the cooling water. Obviously, with other kinds of canned goods, similar disadvantageous results will follow where undesirable temperature conditions prevail in the cooling operation.

We have found that formation of undesirable products of the character noted above can be substantially eliminated by subjecting the cans of goods to a rapid, continuous cooling action until the temperature thereof is well below the critical temperatures at which undesirable products are formed, such as "skin" and "burn on" in canned milk, for example. This is preferably effected by providing a spray of cooling medium, such as water, which is applied to cans of goods in the air space above the cooling water at and adjacent the entrance end of the cooler.

Accordingly, it is the principal object of the invention to provide a canned goods cooler which insures that the goods shall not be subjected to undesirable temperature conditions in the cooling operation.

A further object is to provide a pressure cooler with means which insures that canned goods are continuously and rapidly cooled while passing therethrough.

Another object of the invention is to provide a pressure cooler which attains the foregoing objects and which is especially useful in cooling cans of condensed milk.

Other objects will be apparent from the following description of a preferred embodiment of my invention, reference being had to the accompanying drawing, in which:

Fig. 1 is an elevational view showing a cooler embodying the invention, certain parts being illustrated diagrammatically and by legend, and in which a part of the cooler shell has been broken away to show a sectional elevation wherein is illustrated structure relating to this invention;

Figs. 2 and 3 are enlarged sectional views taken in planes indicated by the lines II—II and III—III of Fig. 1; and Fig. 4 shows a detail of the apparatus.

Referring to the drawing, there is illustrated a pressure cooler comprising horizontally supported shell or tank 1, to and from which cans are delivered and discharged by means of pressure tight valves through respective intake and discharge ports 2 and 3. The can conveyor within the cooler is of conventional construction and comprises a reel having an endless series of longitudinal pockets preferably extending the full length of the shell and along which cans are slid by a spiral canway formed on the inside of the cooler shell. As the cans enter the cooler through port 2 they are received in longitudinal pockets 4 of reel 5, and between the convolutions of spiral T-bar or rail 6 which forms a stationary spiral canway secured to shell 1. Reel 5 comprises a plurality of longitudinally disposed peripherally spaced impeller bars or angles 7 forming pockets 4 therebetween and secured to spiders 8 which are in turn carried for rotation by shaft 9 suitably journalled in end walls 10 of the shell. The cans are received in pockets 4 between impeller bars 7 as they enter through port 2 and are driven thereby between the convolutions of the spiral canway and so take a definite course through the shell toward the outlet port 3, where they are suitably transferred from the reel to a discharge valve in a well-known manner. The cooker or sterilizer and the valve construction are not illustrated as they are of conventional construction and are not necessary to an understanding of the present invention. Typical constructions of the sterilizer and transfer and the discharge valve are illustrated in the patents to Albert R. Thompson, Nos. 1,467,960, dated September 11, 1923, and Re. 15,334, dated April 11, 1922.

The cooler contains a body of cooling water 11 which is maintained at a mean level L by means of a control mechanism 12 such as a float operated valve of well-known construction which releases excess water through a drain 13. The level of the water is constantly maintained below the inlet 2 and the outlet 3 in order that it shall not interfere with the movement of cans onto the reel and in order to prevent transfer of water from cooler to cooker by the transfer valve. The temperature of the body of cooling water is maintained uniformly low by repeated additions of fresh cold water through a header 14, as determined by a thermostatic control device 15 which controls the actuation of a valve 16 by compressed air from a source 17 all in a well-known manner. Within the space 18 overlying the water level, a volume of air is maintained under pressure by means of a suitably controlled air pump 19.

In the operation of the cooler in accordance with the foregoing description, it will be appreciated that cans enter the cooler at the inlet 2 while at a high temperature and are deposited between a pair of adjacent impeller bars 7 of the reel and between adjacent convolutions of spiral rail 6 and that as the reel rotates, the hot cans first pass through the air space 18 surrounding the canway defined by the initial convolutions 20 and 21 of the spiral trackway. Thereafter the cans are repeatedly and successively immersed in the body of cooling water and passed through the air space, being at the same time moved longitudinally of the cooler by the spiral canway. In this manner the cans yield their heat to the cooling water and eventually reach the outlet 3 where a suitable discharge device and valve effect their removal from the cooler.

From the above description, it is seen that after each successive cooling of a can of goods resulting from immersion in the cooling water, the can is subjected to heating from air above the cooling water and from the hot goods in the can, so that certain disadvantageous results, such as "skin" and "burn on" result during the initial part of the travel of the cans.

In accordance with the instant invention, the above undesirable results are obviated by applying a cooling medium such as cold water to the cans as they pass through the air space in the vicinity of the inlet valve. It will be seen by reference to the drawing that such means for applying such cooling medium may by preference take the form of a spray device, including cold water supply pipe 22 which is connected by means of control valves 23 and suitable pipes to a plurality of arcuate sprinkler heads 24 and 24' positioned between adjacent convolutions of the spiral canway at and adjacent intake port 2.

As illustrated in Fig. 3, sprinkler head 24' extends from port 2 in the direction of can movement and terminates just short of the water level. The succeeding sprinkler heads 24, as illustrated in Fig. 2, each extend throughout the air exposed arcuate extent of the adjacent canway. Each sprinkler head 24 (Fig. 4) may be formed of rectangular metal tubing to provide for economy of space, and have an appropriate number of orifices 25 through which a spray of cold water or the like is ejected under pressure. Each sprinkler head 24 may be secured in shell 1 as by rivets 30 at each end of the head, and by adapter 26 (Fig. 4) secured as by welding to head 24 intermediate its ends and extending through an aperture in shell 1. Adapter 26 is threaded for coupling with pipe fitting 29 by means of which packing 27 and washer 28 are held in sealing engagement with shell 1 and adapter 26. Thus, the sprinkler heads are mounted to provide a strong shell construction with a minimum number of apertures.

It will be clear that by reason of such construction, a continuous spray of cold water is directed upon the cans in the air space from the time they enter the cooler until they have reached a safe low temperature, and that this spray not only directly cools the cans but also absorbs heat from the air before eventually reaching the main body of cooling water. It has been found that by the provision of such an arrangement the cans are subjected to a rapid and continuous cooling effect in the initial period of cooling, thereby preventing undesirable temperature conditions and substantially eliminating the formation of undesirable products, such as "skin", "burn-on" and the like in the milk, for example.

We claim:

1. In a pressure cooler, a horizontally disposed, cylindrical shell, a spiral canway mounted within said shell, means for progressing cans along said canway, and spray devices mounted between the convolutions of said canway for applying a cooling medium to cans engaged with said canway.

2. In a pressure cooler, a horizontally disposed, cylindrical shell, a spiral canway mounted within said shell, means for progressing cans along said canway, and spray devices mounted between the convolutions of said canway for applying a cooling medium to cans engaged with said canway, each spray device comprising rectangular hollow tubing.

3. In a pressure cooler, a horizontally disposed, cylindrical shell, a spiral canway mounted within said shell, means for progressing cans along said canway, a spray device between adjacent convolutions of said canway, a source of cooling medium outside of said shell, and connecting means between said source of cooling medium and said spray device comprising an adapter secured to said spray device and extending through an aperture in said shell.

4. In a pressure cooler, a horizontally disposed cylindrical shell, a continuous member disposed therein to provide a helically trending canway, a reel for propelling cans along said canway, and spray heads mounted on said shell between adjacent convolutions of said member for applying a cooling spray to cans engaged with said canway.

5. In a pressure cooler, a horizontally disposed cylindrical shell, a continuous member disposed therein to provide a helically trending canway, a reel for propelling cans along said canway, and spray tubes conforming to the contour of said shell and secured thereto between adjacent convolutions of said member for applying a cooling spray to cans engaged with said canway.

6. In a pressure cooler, a horizontally disposed cylindrical shell, a continuous member disposed therein to provide a helically trending canway, a reel for propelling cans along said canway, and rectangular spray tubes conforming to the contour of said shell and secured thereto between adjacent convolutions of said member for applying a cooling spray to cans engaged with said canway and means for securing each tube in said shell consisting of rivet means fastening the tube ends to said shell and an adapter conduit connected to said shell and said tube for supplying cooling medium to said tube.

JOSEPH BUCHER.
EMERY F. TULLAR.